INVENTOR.
Frank G. Back
and Herbert Lowen

Patented Dec. 26, 1950

2,535,115

UNITED STATES PATENT OFFICE 2,535,115

LENS FOR MOTION-PICTURE CAMERAS

Frank G. Back, New York, and Herbert Lowen, Forest Hills, N. Y.; said Lowen assignor to said Back Application October 14, 1948, Serial No. 54,482

1 Claim. (Cl. 88—57)

This invention relates to new and useful improvements in lenses and has especial reference to those adapted for use in motion picture cameras.

An object of the invention is to provide a lens unit which is substantially free from aberrations, such as distortion, spherical aberrations, curvature of field, and coma.

A further object is to provide such a lens as can be stopped down without shifting the image plane.

A further object is to provide a very fast lens with a relative aperture of F:1.3 with a completely satisfactory resolution.

A further object is to provide a lens which is practically free from primary and secondary color, laterally and longitudinally.

Still another object is to provide such a lens that can be focused for close objects by simply moving the front lens unit instead of the whole lens.

Yet another object is to provide a combination of lens housing and supporting tubes so mechanically related that they can be rotatably adjusted relative to each other to a very fine degree without the use of screw threads.

Still another object is to provide a simple means whereby the tubular housing may be very quickly and easily adjusted in relation to the tube housing the rear lens combination to enable the operator to readily see the reference marks on the graduated scales and to fit the housing snugly into place against the tube housing the rear lens combinations, when so readjusted.

Further and more specific objects, features and advantages will more clearly appear from a consideration of the detailed specification hereinafter set forth, especially when taken in connection with the accompanying drawing which illustrates a present preferred form which the invention may assume and which forms part of the specification.

In brief and general terms the invention concerns the provision of a series of positive doublets, three in number, achromatic in nature, in a lens tube, one doublet in the front thereof and adjustable, and of relatively lower power, and two in the rear of the tube, spaced closely to each other, and of relatively larger power. The distance between the front doublet and the nearest rear doublet is relatively large relative to the space between the respective rear doublets. Each doublet is composed of a positive crown abutting a negative flint. In the lens all the crowns face one way and the flints the other way.

In another particular, the invention concerns the provision of a resilient frictional contact between the lens housing and a lens supporting tube rotatable thereon to permit fine adjustments of the tube on the housing and dispensing entirely with the use of screw threads. Preferably this takes the form of a resilient finger cut out of one of the elements and frictionally engaging the adjacent surface of the other.

Still further, the invention includes the provision of a bevel or inclined annular slope near the end of the lens housing into which bevel screws on the lens tube may project whereby as the pin or screw are projected into the bevel, the slope of its bottom will axially position the tube on the housing.

The present preferred form which the invention may assume is illustrated in the drawings, of which—

Figure 1:
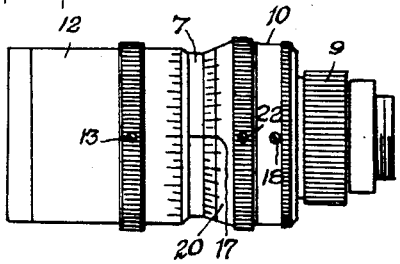
Figure 1 is a side elevation of the lens unit.

Referring now merely to the specific form of the invention shown in the drawings, it is seen that the device includes six lens elements 1, 2, 3, 4, 5 and 6. Elements 1, 3 and 5 are positive crown lenses and elements 2, 4 and 6 are negative flint lenses. Each crown is cemented to a flint as indicated in such a way as to form achromatic doublets. These doublets are positioned in such a way that all the positive crown elements face the object while the flint negative elements face the film.

Preferably for the crown elements we use a low dispersion glass (with a high $v$) and for the flints we employ a dense flint with a high dispersion (low $v$). In the example hereafter in detail set forth we combine borosilicate crown glass (BSC-2) with a dense barium flint glass (DBF-1). In this manner we can make the crowns of the rear lenses symmetrical. The front doublet comprising lenses 1 and 2 has only ¾ the power of each of the two rear doublets. The distance between the front doublet formed by lenses 1 and 2 and that formed by lenses 3 and 4 is quite substantial compared to the short distance between the latter doublet and the one formed by lenses 5 and 6 as shown. The greater distance is indicated by the arrowed line in Fig. 2 along the horizontal center line of the figure.

The structure includes a tubular housing 7 with the iris or diaphragm 8 disposed as shown somewhat nearer the rear doublets than the front doublet. The rear doublets are housed in a tube 9 having a flange 10 encircling the tube 7. The front doublet 1 and 2 is housed in a tube 11 to which is tightly fitted a sleeve 12 rotatable on the main tube 7 with a pin 13 therein riding in a curved slot 14 in the tube 7 to adjust the front doublet axially in focus. A ring 20 is disposed on the tubular housing 7 between the sleeve 12 and the tube 9. It is, of course, understood that the exact position of the diaphragm and the exact shape or curvature of the lenses is a matter of correction well known in the art and dependent upon the results desired.

Figure 2:
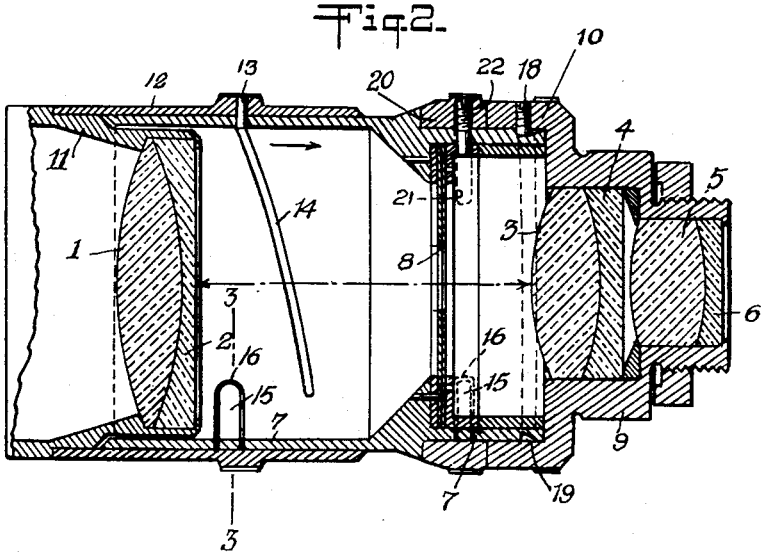
Fig. 2 is an enlarged sectional view through the unit.
Figure 3:
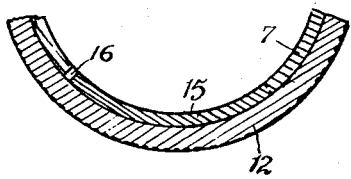
Fig. 3 is a cross sectional view taken on the line 3—3 of Fig. 2.

In order to facilitate the rotary adjustment of the sleeve 12 and ring 20 on the tubular housing 7, we have dispensed with the use of the usual expensive screw threads which are easily damaged and provide a resilient frictional contact between them and the housing element in the form of a spring finger. In Figs. 2 and 3, this spring finger 15 is shown cut out on the cylindrical surface of the housing 7 with a very narrow curved slot 16 between it and the adjacent body of the tube 7. It is, of course, obvious that this spring finger will press resiliently against the adjacent inner surface of the ring 20 to frictionally hold the ring 20 in any adjusted position. The pin and slot action 13 and 14 control the axial movement of sleeve 12 and the spring finger 15 controls the circumferential movement. It is found that very fine adjustments can be made without the expense of screw threads which are constantly being damaged. At the left in Fig. 2 is shown a similar spring finger formed to press against the inner surface of the sleeve 12 and this is identical, except for size, with the one shown in connection with the ring 20.

The invention further relates to a simple means for permitting the operator to adjust the ring 20 on the housing 7. By reason of the fact that different cameras have variable starting points on their threads at the place where the lens is screwed on, it sometimes happens that the reference marks indicated by the numeral 17 in Fig. 1 are not visible to the operator so that it becomes necessary to turn the housing 7 around so that the operator can see the reference marks. To permit this, the screw 18 in flange 10 which ordinarily projects from it into an annular bevel 19 on the adjacent surface of housing 7 is loosened to permit the housing to be turned to bring the reference marks 17 into the view of the operator, thereafter the pin or screw 18 is moved into place with its inner end projected forcibly against the slope of the annular bevel 19 in the housing 7, said annular bevel sloping downwardly from the end of the housing toward the middle thereof. It is thus that the forcible projection of the pin or screw 18 against this slope of the annular bevel will tend to move the housing 7 axially so that it will be firmly pressed against the flange 10 of tube 9. This will insure a secure definite position for the tube 9 with its supported lens doublets.

In order to adjust the diaphragm 8, the tubular housing 7 is provided with a circumferential slot 21 through which projects a screw threaded pin 22 disposed on the ring 20 so that as the ring 20 is turned on the housing 7 the diaphragm 8 connected to pin 22 may be adjusted.

As an example the following is a specification of one such a lens combination as we have described:

| Lens | Glass | Radii | Thickness and Separation |
|---|---|---|---|
| $L_1$ | BSC-2 $N_D=1.517$ $v=64.5$ | $R_1=+95.76$ $R_2=+87.04$ | $T_1=17.56$ |
| $L_2$ | DBF-1 $N_D=1.617$ $v=38.5$ | $R_3=-87.04$ $R_4$ plane | $S_1=0$ $T_2=2.60$ |
| $L_3$ | BSC-2 $N_D=1.517$ $v=64.5$ | $R_5=+69.40$ $R_6=+69.40$ | $S_2=62$ $S_3=25.16$ $T_3=18.21$ |
| $L_4$ | DBF-1 $N_D=1.617$ $v=38.5$ | $R_7=-69.40$ $R_8=-977.39$ | $S_4=0$ $T_4=5.20$ |
| $L_5$ | BSC-2 $N_D=1.517$ $v=64.5$ | $R_9=+69.40$ $R_{10}=+69.40$ | $S_5=2.60$ $T_5=18.21$ |
| $L_6$ | DBF-1 $N_D=1.617$ $v=38.5$ | $R_{11}=-69.40$ $R_{12}=-977.39$ | $S_6=0$ $T_6=5.20$ |

Equivalent focal length equals 100 mm.
Radii, thickness and separation in mm.
In the above table the following terms may be defined as follows:
R equals radius of curvature.
T equals thickness.
S equals axial spacing.
N equals index of refraction.
$v$ equals Abbe's dispersion number (a glass characteristic well known in the art of optics and glass making).
BSC equals borosilicate crown.
DBF equals dense barium flint.

It is to be noted that other telephoto lenses on the market consist basically of a positive front element and a negative rear element. These suffer from heavy aberrations, especially distortion, zonal spherical aberration, and coma. Our new lens consists only of positive units and is practically free of spherical aberration and coma not only for the marginal ray but also the intermediate zones, so that the lens can be stopped down without shifting the image plane. Our lens can also be opened to a relative aperture of F:1.3 and its resolution is still completely satisfactory. It is absolutely free of distortion, and the negative astigmatism which has to be introduced to obtain a flat field can be reduced, by methods well known in the art, to such an extent that it does not impair the image quality. As far as color correction is concerned, though it is not an apochromat in the technical sense of the word, it is practically free not only from primary but also from secondary color, laterally and longitudinally.

Another feature of advantage resident in our lens consists in the fact that focusing for close objects is done simply by moving the front lens. This simple focusing has the advantage that the relative aperture does not change when the lens is focused for a close-up. Most ordinary lenses, which do the focusing by moving the whole lens, lose speed even if the stop lever is not moved. The mechanical movement in this case is several times greater than if the whole assembly is moved for focusing, and will give greater accuracy and less wear.

While the invention has been described in detail and shown with respect to the accompanying drawing, it is not to be limited to such details, since many changes and modifications may be made in the invention without departing from the spirit and scope thereof. Hence, it is desired to cover any and all forms and modifications of the invention which may come within the language and scope of the appended claim.

What we claim as our invention is:

A lens unit which includes a lens tube, a series of positive doublets therein, each formed of an abutting positive crown and a negative flint with all the crowns facing the object and all the flints facing the other way, said series comprising a front doublet and two closely spaced rear doublets, the front doublet being spaced relatively a larger distance from the nearest rear doublet, the specifications of the glasses forming the several doublets, considered from the front to the rear of the lens, being tabulated as follows:

| Lens | Glass | Radii | Thickness and Separation |
|---|---|---|---|
| $L_1$ | BSC-2<br>$N_D=1.517$<br>$v=64.5$ | $R_1=+95.76$<br>$R_2=+87.04$ | $T_1=17.56$ |
| $L_2$ | DBF-1<br>$N_D=1.617$<br>$v=38.5$ | $R_3=-87.04$<br>$R_4$ plane | $S_1=0$<br>$T_2=2.60$<br>$S_2=62$ |
| $L_3$ | BSC-2<br>$N_D=1.517$<br>$v=64.5$ | $R_5=+69.40$<br>$R_6=+69.40$ | $S_3=25.16$<br>$T_3=18.21$ |
| $L_4$ | DBF-1<br>$N_D=1.617$<br>$v=38.5$ | $R_7=-69.40$<br>$R_8=-977.39$ | $S_4=0$<br>$T_4=5.20$ |
| $L_5$ | BSC-2<br>$N_D=1.517$<br>$v=64.5$ | $R_9=+69.40$<br>$R_{10}=+69.40$ | $S_5=2.60$<br>$T_5=18.21$ |
| $L_6$ | DBF-1<br>$N_D=1.617$<br>$v=38.5$ | $R_{11}=-69.40$<br>$R_{12}=-977.39$ | $S_6=0$<br>$T_6=5.20$ | in which certain of the above terms are defined as follows:

R equals radius of curvature.
T equals thickness.
S equals axial spacing.
N equals index of refraction.
$v$ equals Abbe's dispersion number (a glass characteristic well known in the art of optics and glass making).
BSC equals borosilicate crown.
DBF equals dense barium flint.

FRANK G. BACK.
HERBERT LOWEN.

REFERENCES CITED

The following references are of record in the file of this patent:

UNITED STATES PATENTS

| Number | Name | Date |
|---|---|---|
| 943,105 | Wadersieb | Dec. 14, 1909 |
| 1,688,441 | Stewart | Oct. 23, 1928 |
| 1,883,673 | Fouquet | Oct. 18, 1932 |
| 1,922,537 | Fouquet | Aug. 15, 1933 |
| 1,988,390 | Naumann | Jan. 15, 1935 |
| 2,042,815 | White | June 2, 1936 |
| 2,321,973 | Bennett | June 15, 1943 |
| 2,382,669 | Schade | Aug. 14, 1945 |